UNITED STATES PATENT OFFICE.

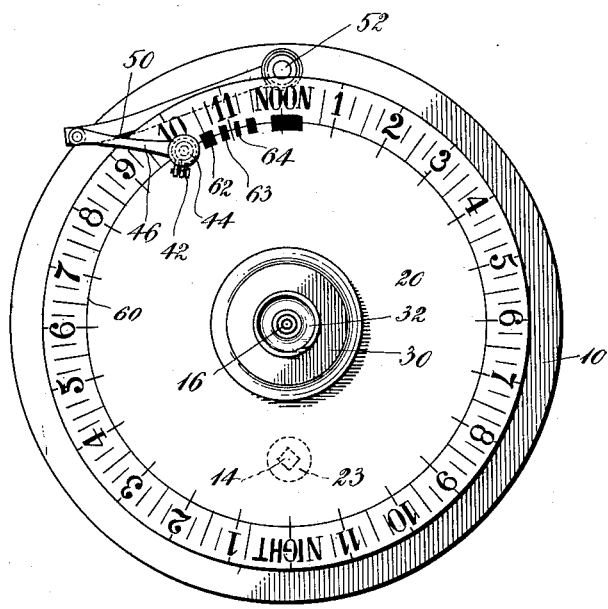

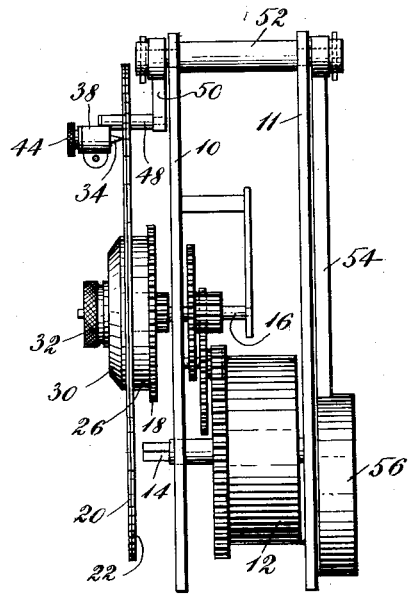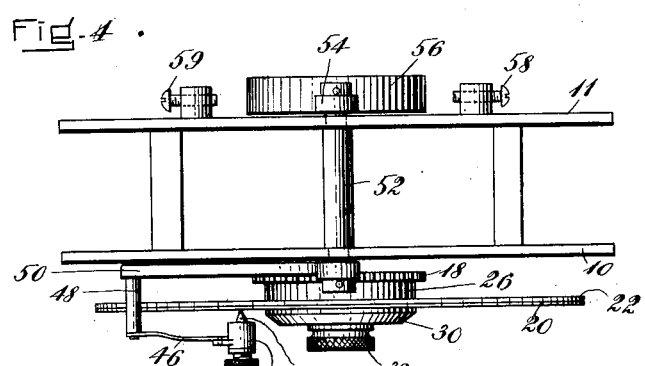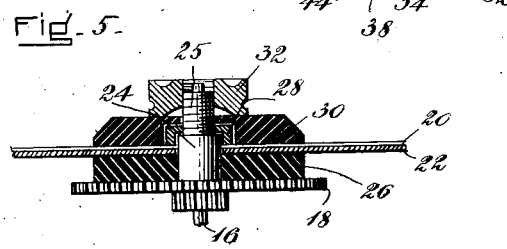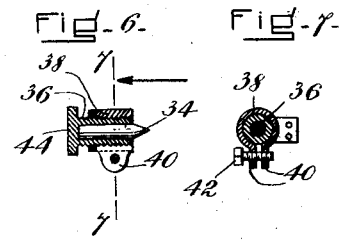

WALTER E. McGRAW, OF MALDEN, MASSACHUSETTS, ASSIGNOR TO BOSTON CLOCK COMPANY, OF BOSTON, MASSACHUSETTS, A CORPORATION OF MASSACHUSETTS.

VIBRATION-RECORDER.

1,078,867.      Specification of Letters Patent.      Patented Nov. 18, 1913.

Application filed October 2, 1912. Serial No. 723,565.

*To all whom it may concern:*

Be it known that I, WALTER E. MCGRAW, residing at Malden, in the county of Middlesex and State of Massachusetts, have invented new and useful Improvements in Vibration-Recorders, of which the following is a specification.

This invention relates to a device for automatically recording the running or movements of a conveyance or vehicle by actuation of the recording means from vibrations of the vehicle.

The object of the invention is to provide a recording device of this character which is sensitive to the vibrations of the vehicle so as to make a record, yet is simple in construction.

I will describe my invention in the following specification and point out the novel features thereof in the appended claim.

In the accompanying drawing Figure 1 is a front elevation of a recording device embodying the invention, Fig. 2 is a rear elevation of the same, Fig. 3 is a side elevation, Fig. 4 is a plan view, Fig. 5 is a sectional plan view on an enlarged scale of the means for attaching the record carrier, and Figs. 6 and 7 are sectional detail views of the holder for the marking implement.

As illustrated in the drawing 10 and 11 represent the front and rear plates respectively, of a clock mechanism, comprising a spring drum 12, winding arbor 14, center arbor 16, minute gear 18 on the center arbor, and suitable gearing between the center arbor and the spring drum which may be of any well known construction.

The record is received upon a sheet 20, preferably of sensitized paper carried by a sheet metal plate 22, which surrounds a sleeve 24 fast on the center arbor 16. The record receiving sheet may be provided with any suitable scale to indicate divisions of time. It preferably consists of a circular series of divisions representing fractions of an hour, extending over a period of twenty four hours, although other forms of scales may be employed. The plate 22 is provided with a hole 23, which is located so as to be opposite the winding arbor 14 at a certain time, or the plate may be turned to bring the hole opposite the arbor so that the clock may be wound prior to putting on a new record receiving sheet. Thus the device, including the clock mechanism, may be inclosed in any suitable case which is entirely closed, and the necessity of providing key apertures is obviated.

A disk 26 of hard rubber or other suitable material surrounds the sleeve 24 and is affixed to the front of the gear 18. The outer end 25 of the sleeve 24 is screw-threaded to fit a correspondingly threaded thimble 28, which engages the record sheet 20 and holds it against the plate 22. The plate 22 is clamped against the disk 26 by a disk 30, which may also be made of hard rubber, or any other suitable material, said disk 30 being engaged by a knurled thumb nut 32 threaded upon the end 25 of the sleeve 24. The disk 30 incloses the thimble 28, the purpose of the latter being to prevent the record sheet from falling away from the plate 22 upon the removal of the clamping disk 30, and also to facilitate the adjustment of the record sheet with respect to the marking implement.

The record is produced by a marking implement 34, which may be a piece of solder or other suitable material, adapted to make a mark on the sensitized paper sheet 20. The marker 34 may be held in any suitable holder. As here shown, the holder comprises a cylindrical member 36 having a socket for holding the marker 34 and externally threaded to fit a split sleeve 38 provided with ears 40 adapted to receive a clamping screw 42. The holder 36 is provided with a knurled head 44, which may be readily grasped to adjust the marker with respect to the record sheet. When the marker is properly adjusted it is clamped by the screw 42 to prevent its displacement by the jarring occasioned by the vehicle upon which the instrument is mounted.

The marker is mounted upon one end of an arm 46 which is adapted to oscillate in a plane substantially parallel to that of the record-receiving sheet. The arm 46 is preferably in the form of a flat spring attached at one end to a pin 48 carried by one end of a rocker arm 50, the other end of which is fast on one end of a rock shaft 52 journaled in the plates 10 and 11. Affixed to the other end of the shaft 52 is an arm 54 having a weight 56 at its lower end. This weight swings like a pendulum due to the vibrations of the vehicle upon which the device is mounted, and the to-and-fro motion of this pendulum causes the marking implement 34 to move back and forth across the sensitized paper sheet 20 in a substantially radial direction, thus producing a short mark for each oscillation of the pendulum. The movements of the weight 56 are limited by stop screws 58 and 59, although yielding buffers may be provided in their places to prevent violent jarring of the clock mechanism due to the impact of the weight.

In use the device is mounted in a convenient position on the vehicle, the clock mechanism being relatively stationary while the weight 56 is free to swing back and forth. The plate 22 together with the attached record-receiving sheet 20 is rotated by the clock mechanism. When the vehicle is standing still the marker 34 will produce a smooth circular mark or line 60 on the paper sheet, but when the vehicle is in motion its vibration causes the weight 56 to oscillate and the marker moves radially across the face of the record-receiving sheet a short distance, producing solid or substantially solid marks 62, 63, 64 of various lengths depending upon the length of time that the vehicle is in motion. With this form of construction the action is positive, there are no springs which need adjustment, and the mechanism is exceedingly simple.

While I have illustrated and described a preferred embodiment of the invention, I am aware that many modifications can be made therein by any person skilled in the art without departing from the scope of the invention as expressed in the claim. Therefore, I do not wish to be limited to all the details of construction shown and described, but

What I claim is:—

In a vibration recorder, the combination of a clock mechanism having a center arbor and a front and rear plate, a plate rotatable with said arbor adapted to carry a record sheet, a rock shaft rotatably mounted in said front and rear plates above the clock mechanism, a pendulum depending from said shaft outside of the rear plate, an arm affixed to said shaft and movable outside of said front plate, and a marker carried by said arm adapted to move over said sheet, whereby at each oscillation of said pendulum said marker is moved in a plane substantially parallel to said record sheet to produce a substantially radial mark thereon, substantially as described.

WALTER E. McGRAW.

Witnesses:
 George Clarendon Hodges,
 Chas. F. Howe.